(12) United States Patent
Lee

(10) Patent No.: US 7,492,489 B2
(45) Date of Patent: Feb. 17, 2009

(54) TWO-DIRECTIONS SCANNING METHOD

(76) Inventor: Kuan-Yu Lee, 97, Sec. 2, Chang-An Rd., Shi-Tun, Taichung (TW)

( * ) Notice: Subject to any disclaimer, the term of this patent is extended or adjusted under 35 U.S.C. 154(b) by 527 days.

(21) Appl. No.: 10/054,961

(22) Filed: Jan. 25, 2002

(65) Prior Publication Data
US 2003/0147102 A1    Aug. 7, 2003

(51) Int. Cl.
H04N 1/04 (2006.01)
(52) U.S. Cl. ........................ 358/474; 358/486; 358/497; 282/282; 282/274
(58) Field of Classification Search ................. 358/474, 358/505, 516, 518, 537, 497, 496, 488, 42, 358/483, 486; 382/100, 298, 274; 355/40, 355/56; 250/208.1
See application file for complete search history.

(56) References Cited

U.S. PATENT DOCUMENTS

| | | | | |
|---|---|---|---|---|
| 5,726,773 A * | 3/1998 | Mehlo et al. | ................. | 358/474 |
| 5,734,758 A * | 3/1998 | Yamamoto et al. | ........... | 382/274 |
| 6,147,780 A * | 11/2000 | Chiang | ........................ | 358/497 |
| 6,658,163 B1 * | 12/2003 | Takaoka | ...................... | 382/254 |
| 6,747,765 B2 * | 6/2004 | Kitamura et al. | ............ | 358/497 |
| 6,768,485 B2 * | 7/2004 | Awamoto et al. | ........... | 345/204 |
| 6,791,723 B1 * | 9/2004 | Vallmajo et al. | ............ | 358/488 |
| 6,850,653 B2 * | 2/2005 | Abe | ............................. | 382/312 |
| 7,196,818 B2 * | 3/2007 | Narushima et al. | ........... | 358/1.9 |
| 7,202,975 B2 * | 4/2007 | Narushima et al. | ........... | 358/1.9 |
| 7,221,464 B2 * | 5/2007 | Yamano | ...................... | 358/1.13 |
| 2002/0075465 A1 * | 6/2002 | Nakamura et al. | ............ | 355/40 |
| 2003/0048487 A1 * | 3/2003 | Johnston et al. | ............. | 358/474 |

* cited by examiner

Primary Examiner—Edward L. Coles
Assistant Examiner—Negussie Worku
(74) Attorney, Agent, or Firm—Stolowitz Ford Cowger LLP

(57) ABSTRACT

The present invention relates to a scanning method, more particularly, to a two-directions scanning method by using a user interface (UI). At first, a scanning mode is chosen and the first dpi (dots per inch) of the preview procedure is set in the user interface. Then an instruction is keyed in the user interface to make a scan head move along the first scanning direction by using the first dpi and start the first scanning procedure. The first scanning procedure is a preview procedure. After finishing the first scanning procedure, a user can view the first image, which is got from the first scanning procedure, on a monitor and the scan head moves along the second scanning direction by using the second dpi to start the second scanning procedure. The second image data, which is got from the second scanning procedure, is saved in a memory. The second dpi is usually the highest dpi of the scan head. Following the needs of the user, the second dpi can be preset in the user interface to increase the scanning rate of the second scanning procedure. After the user selects a scope of the first image, which he or she wants to get, and the third dpi is set, the user interface will get the partial second image, which is corresponding to the scope of the first image that is selected by the user, by using a program to adjust a graph image coordinate and a dpi scale. At last, the third image, which is got according to the third dpi and the scope of the first image that he or she wants to get, is shown on the monitor.

29 Claims, 1 Drawing Sheet

TWO-DIRECTIONS SCANNING METHOD

BACKGROUND OF THE INVENTION

1. Field of the Invention

The present invention relates to a scanning method, more particularly, to a two-directions scanning method by using a user interface (UI) to decrease time of a scanning procedure.

2. Description of the Prior Art

For present information users, especially to the personal computer users, a mode of the computer information has been changed from an unexciting word mode to a multi-media mode. The multi-media mode means that the information comprises words, images, and sounds. In order to show the multi-media mode in the face of viewers, various multi-media devices, which can collect the images and sounds, are developed. Because the multi-media information comprises more matters, memories, which are used to deal with the multi-media information, are greater than memories, which are used to deal with the unexciting word information to show the multi-media information more smoothly.

For an input image device, scanners and digital cameras are the common devices at the present day. The digital camera uses digital information to save the image, which is got from shooting a scene on a location. It uses a floppy disk card or a personal computer memory card international association (PCMCIA) card to save a static image. In order to decrease the memory of saving multi-media information, the images, which are got from shooting a scene on a location by using a digital camera, are saved by using compression files. The file format of a joint photographic experts group (JPEG) mode is common used in the static image compression files.

For using kinds of scanners, the scanners are divided into three kinds, such as: (1) a handly scanner; (2) a desktop scanner (flat bed scanner); and (3) sheet-feed scanner. Dot per inch (DPI) is a unit of a definition of the scanning procedure. If DPI is higher and higher, the quality of the scanner is higher and higher, but time of the scanning procedure is longer and longer. When scanning the color image, most scanners must divide the color image into three primary colors, such as red, green, and blue, to scan. Therefore, the scanning procedure must repeat three times and will cause time of the scanning procedure to be increased.

Although a scanning method of scanners has scanned three primary colors that includes red, green, and blue in one scanning procedure at the same time at present. Moving times of the scan head being still more frequently and a moving distance of the scan head being still longer will increase time of the scanning procedure when the scan system is operated from a scanning procedure to an imaging procedure. In the traditional scanning procedure, a user must set the first dpi in a driver of a scan device to make the scan head proceed with the first scanning procedure. The first scanning procedure is a preview procedure. In the first scanning procedure, the scan head moves along the first scanning direction from a scanning initial point to a scanning terminal point. When the scan head moves to the scanning terminal point, the first scanning procedure is finished and the first image, which is got from the first scanning procedure, is shown on the monitor. At the same time, the scan head moves along the second scanning direction from the scanning terminal point to the scanning initial point. The first scanning direction and the second scanning direction are usually opposite directions with each other. The scanning initial point and the scanning terminal point are two end points of a distance of the scan head. The user can view the first image on the monitor and can choose a scope of the first image, which he or she wants to get, on the monitor by using a mouse. Then the user can set the second dpi in the driver of the scanner and the scan head is driven to proceed the second scanning procedure. When the scan head moves to the scanning initial point and receive the instruct about starting the second scanning procedure, the scan head starts to move along the first scanning direction from the scanning initial point to the scanning terminal point to proceed with the second scanning procedure. When the scan head moves to the scanning terminal point, the second scanning procedure is finished and the second image, which is got from the second scanning procedure, is shown on the monitor. The second image is a image, which the user wants to get.

In the traditional scanning procedure, when the first scanning procedure is finished and the second scanning procedure is started, the scan head must move back to the scanning initial point to proofread and correct the dpi and then starts to proceed with the second scanning procedure. In the first scanning procedure and the second scanning procedure, the scan head must move repeatedly between the scanning initial point and the scanning terminal point to increase the movement distance of the scan head and to increase time of the scanning and imaging procedure. When the user is not satisfied in the second image, which is got from the second scanning procedure, the user must reset the second dpi and then proceed with the second scanning procedure to get the image, which the user wants to get. This condition will cause the persecutions for the user.

SUMMARY OF THE INVENTION

In accordance with the background of the above-mentioned invention, the traditional scanning method will increase time of scanning procedure and cause inconveniences for the user. The present invention provides a method to decrease time of the scanning procedure by using a user interface to control a scan head to proceed a two-directions scanning procedure and reusing image data, which are got from a finished scanning procedure.

The second objective of the present invention is to increase conveniences for the user by using a user interface to control a scan head to proceed a two-directions scanning procedure and reusing image data, which are got from a finished scanning procedure.

The further objective of the present invention is to increase a working efficiency of the user by using a user interface to control a scan head to proceed a two-directions scanning procedure and reusing image data, which are got from a finished scanning procedure.

In according to the foregoing objectives, the present invention provides a two-directions scanning method to decrease time of the scanning procedure by using the user interface to control the scan head to proceed the two-directions scanning procedure and reusing image data, which are got from a finished scanning procedure. At first, a scanning mode is chosen and the first dpi (dots per inch) of the preview procedure is set in the user interface. Then an instruction is keyed in the user interface to make a scan head move along the first scanning direction by using the first dpi and start the first scanning procedure. The first scanning procedure is a preview procedure. After finishing the first scanning procedure, a user can view the first image, which is got from the first scanning procedure, on a monitor and the scan head moves along the second scanning direction by using the second dpi to start the second scanning procedure. The second image data, which is got from the second scanning procedure, is saved in a memory. The second dpi is usually the highest dpi of the scan head. Following the needs of the user, the second dpi can be preset in the user interface to increase the scanning rate of the second scanning procedure. When a length of a paper, which the user want to scan, is longer than a length which the scan head passes through in the scanning procedure, the scan head will use the first dpi and the second dpi in turn to proceed the second scanning procedure because the scan head has got a size and a location of the paper in the first scanning procedure to increase the efficiency of the second scanning procedure. When the scan head has not scanned the paper, the scan head will use the first dpi in the second scanning procedure. When the scan head scans the paper, the scan head uses the second dpi in the second scanning procedure. After the user selects a scope of the first image, which he or she wants to get, and the third dpi is set, the user interface will get the partial second image data, which is corresponding to the scope of the first image that is selected by the user, by using a program to adjust a graph image coordinate and a dpi scale. At last, the third image, which is got according to the third dpi and the scope of the first image that he or she wants to get, is shown on the monitor. When the third dpi is equal to the second dpi, the third image is the partial or the complete second image. When the third dpi is lower than the second dpi, the third image is produced from the second image, which is passed through an adjusting procedure of the graph image coordinate and the dpi scale. When the user is dissatisfied with the third image, which is got by using the third dpi, the user will reset the third dpi to produce the new third image, which the user wants to get, from the second image. The present invention will also increase conveniences for the user and increase the working efficiency of the user.

BRIEF DESCRIPTION OF THE DRAWINGS

In the accompanying drawing forming a material part of this description, there is shown.

DESCRIPTION OF THE PREFERRED EMBODIMENT

Figure 1:
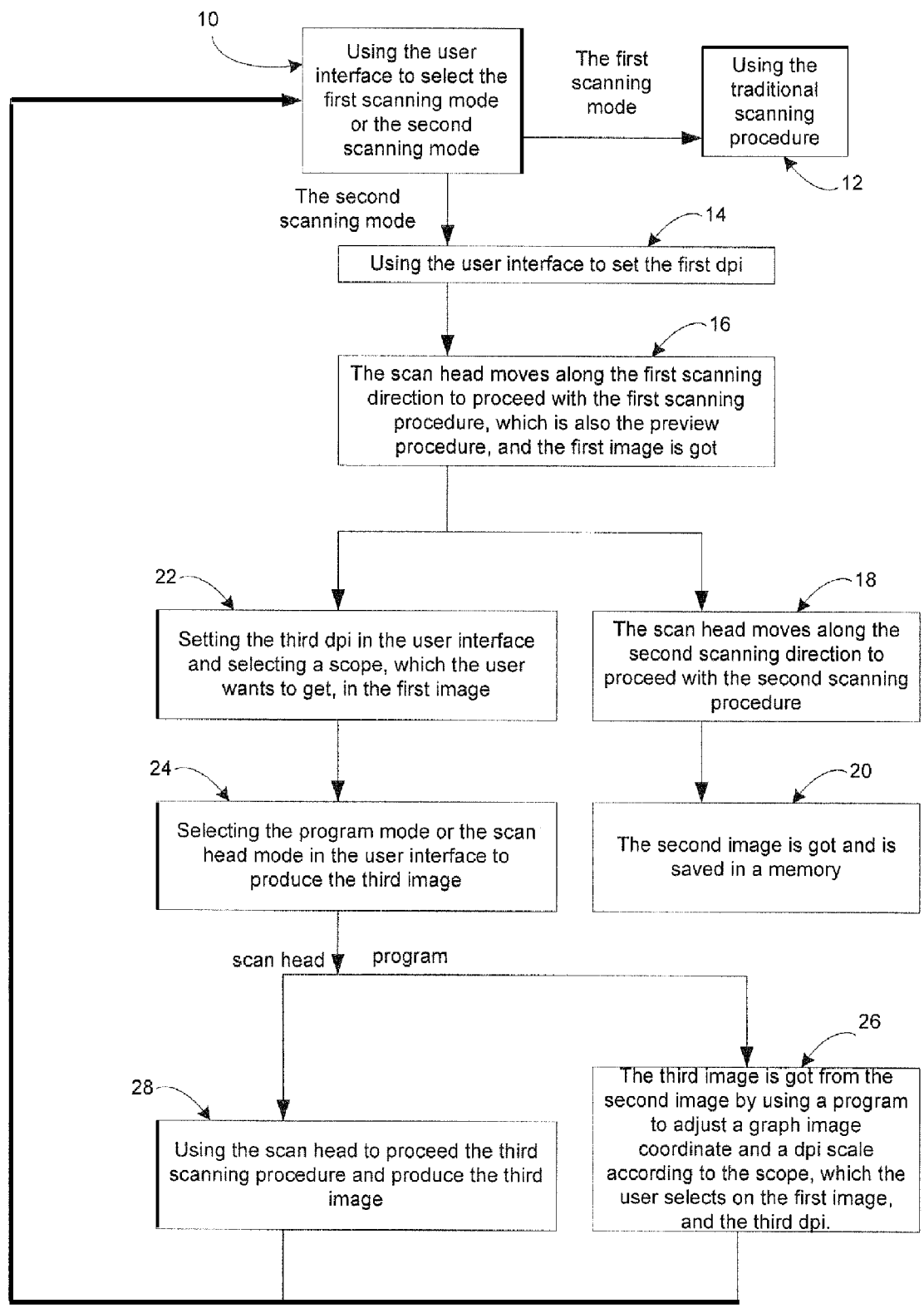
FIG. 1 shows a flow chart of the two-directions scanning procedure of the present invention.

The foregoing aspects and many of the intended advantages of this invention will become more readily appreciated as the same becomes better understood by reference to the following detailed description, when taken in conjunction with the accompanying drawings, wherein:

The present invention provides a two-directions scanning method to decrease time for getting a digital image, which the user wants to get. At first the user must choose scanning modes in the user interface. The scanning modes are divided into the first scanning mode and the second scanning mode. The first scanning mode is the traditional scanning mode and the second mode is the two-directions scanning mode of the present invention. Following different needs of products, the user interface can be pre-set in the two-directions scanning mode to speed up time of scanning procedure.

After the user select the two-directions scanning mode in the user interface, the user must set the first dpi of the first scanning procedure and give an instruction to a scan head to make the scan head start to proceed the first scanning procedure. The scan head is a kind of scan devices and is used to get image data in the scanning procedure. After the scan head receive a signal that expresses to start the first scanning procedure and is finished to proofread and correct for the first dpi by using a dpi check board, the scan head will move along the first scanning direction from the first scanning end point to the second scanning end point, wherein the first scanning end point is the scanning initial point and the second scanning end point is the scanning terminal point of the first scanning procedure. Each scan head of scanning apparatus will move in a line form and will have its own longest moving distance. The first scanning end point and the second scanning end point are usually two end points of the longest moving distance. In usual, the dpi check board is fixed on the first scanning end point to proofread and check the dpi of each scanning procedure.

When the scan head moves to the second scanning end point, the first scanning procedure is finished and the first image is shown on a monitor. The user can view the first image on the monitor. At the same time, the scan head moves along the second scanning direction from the second scanning end point to the first scanning end point to proceed with the second scanning procedure by using the second dpi. Then a second image, which is got from the second image procedure, is saved in a memory to become a temporary file and the memory is a register. The second dpi is usually the highest dpi of the scan head. Following the needs of the user, the second dpi can be preset in the user interface to increase the scanning rate of the second scanning procedure. The first scanning direction and the second scanning direction are the opposite directions of a line. The second scanning end point is the scanning initial point and the first scanning end point is the scanning terminal point of the second scanning procedure. When a length of a paper, which the user want to scan, is longer than a length which the scan head passes through in the scanning procedure, the scan head will use the first dpi and the second dpi to proceed the second scanning procedure because the scan head has got a size and a location of the paper in the first scanning procedure to increase the efficiency of the second scanning procedure. When the scan head has not scanned the paper, the scan head will use the first dpi in the second scanning procedure. When the scan head scans the paper, the scan head uses the second dpi in the second scanning procedure.

In the traditional scanning procedure, a dpi of the scan head in each scanning procedure is just proofread and corrected by using the dpi check board, which is usually fixed in the first scanning end point, in a last step of the scanning process. Therefore, the scan head of the traditional scanning procedure usually has one scanning direction and the locations of the scanning initial point and the scanning terminal point in each scanning procedure are the fixed locations. In the two-directions scanning procedure of the present invention, because the first dpi of the first scanning procedure and the second dpi of the second scanning procedure are set before the first scanning procedure, the scan head can proofread and correct for the first dpi and the second dpi before the first scanning procedure. The scan head will not have to move to the first scanning end point to proceed with the dpi checking procedure again. This condition will decrease time of the scanning procedure.

After the first image is shown on the monitor, the user can select a scope, which he or she wants to get, on the first image and set the third dpi of the image, which he or she wants to get. Then the user must select an image-producing mode in the user interface. The first image-producing mode is to use the scan head to produce the third image. The first image-producing mode is a traditional image-producing mode. After the scan head has finished the second scanning procedure and moved to the first scanning end point, the scan head will moves along the first scanning direction from the first scanning end point to the second scanning end point to proceed the third scanning procedure and then to get the third image.

The second image-producing mode is to use the program to produce the third image. When the user selects a scope, which he or she wants to get, in the first image, which is shown on the monitor, and sets the third dpi of the image, which the user wants to get, the user interface will get the partial second image, which is corresponding to the scope of the first image that is selected by the user, by using the program to adjust a graph image coordinate and a dpi scale. At last, the user interface will get the third image, which is got according to the third dpi and the scope of the first image that is selected by the user, is shown on the monitor and the third image, which the user wants to get, is shown on the monitor.

When the third dpi is equal to the second dpi, the third image is the partial or the complete second image. When the third dpi is lower than the second dpi, the third image is produced from the second image, which is passed through an adjusting procedure of the graph image coordinate and the dpi scale. When the user is dissatisfied with the third image, which is got by using the third dpi, the user will reset the third dpi to produce the new third image, which the user wants to get, from the second image. The reset third dpi is the fourth dpi. Then the user interface will retransform the second image to become the fourth image, whose dpi is the fourth dpi, by using the program to adjust the graph image coordinate and the dpi scale and the fourth image is shown on the monitor to be viewed the user. When the user is dissatisfied with the first image, which is got by using the first dpi, the user will reset the first dpi to produce the new first image, which the user wants to get, from the second image. The reset first dpi is the fifth dpi. Then the user interface will retransform the second image to become the fifth image, whose dpi is the fifth dpi, by using the program to adjust the graph image coordinate and the dpi scale and the fifth image is shown on the monitor to be viewed the user.

In each scanning procedure, a dpi of the scanning procedure is higher and higher, a sense of reality of an image, which is got after the scanning procedure, is higher and higher comparing with the true image and the scanning rate is lower and lower. The second dpi of the second scanning procedure in the present invention is usually the highest dpi of the scan head. Following the needs of the user, the second dpi can be preset in the user interface to increase the scanning rate of the second scanning procedure. In order to get the image from the preview scanning procedure more quickly, the first dpi of the first scanning procedure is lower than the second dpi and the third dpi. Because the third image, whose dpi is the third dpi, is produced from the second image, whose dpi is the second dpi, by using the program to adjust the graph image coordinate and the dpi scale, the second dpi is higher or lower than the third dpi. The first scanning procedure is a preview procedure and the second scanning procedure is the formal scanning procedure, therefore the first dpi, which is used in the first scanning procedure is lower than the second dpi, which is used in the second scanning procedure and the third dpi, which is used in the image procedure by using the program. When the user starts to scan another image and drives the scan head to proceed the first scanning procedure and the second scanning procedure, the temporary file, which was saved in the memory will be replaced by the new file.

Referring to FIG. 1 this shows a flow chart of the present invention. At first, the user has to select the first scanning mode or the second scanning mode in the user interface 10. The first scanning mode is the traditional scanning procedure and the second scanning mode is the tow-directions scanning mode of the present invention. When the first scanning mode is selected, the scanning device will proceed with the traditional scanning procedure 12. When the second scanning mode is selected, the user has to set the first dpi of the first scanning procedure by using the user interface and command the scan head to start the first scanning procedure 14. After the scan head receive a signal that expresses to start the first scanning procedure and is finished to proofread and correct for the first dpi by using a dpi check board, the scan head will move along the first scanning direction from the first scanning end point to the second scanning end point to proceed the first scanning procedure and the first image will be got after the first scanning procedure 16. Then the scan head moves along the second scanning direction from the second scanning end point to the first scanning end point to proceed the second scanning procedure by using the second dpi and the second image, which is got from the second scanning procedure, is saved in a memory to become the temporary file 20. At the same time, the user selects a scope, which he or she wants to get, on the first image and set the third dpi in the user interface 22. The memory is a register. When a length of a paper, which the user want to scan, is longer than a length which the scan head passes through in the scanning procedure, the scan head will use the first dpi and the second dpi to proceed the second scanning procedure because the scan head has got a size and a location of the paper in the first scanning procedure to increase the efficiency of the second scanning procedure. When the scan head has not scanned the paper, the scan head will use the first dpi in the second scanning procedure. When the scan head scans the paper, the scan head uses the second dpi in the second scanning procedure. Then the user must select an image-producing mode, which comprises a program and the scan head in the user interface to produce the third image 24. When the user select to use the program to produce the third image, the program will transform the second image to become the third image according to the scope, which the user selects on the first image and the third dpi in the user interface by using the program to adjust a graph image coordinate and a dpi scale 26. When the user selects to use the scan head to produce the third image, the scan head will proceed with the third scanning procedure to produce the third image 28. When the user is dissatisfied with the third image, which is got by using the third dpi, the user will reset the third dpi to produce the new third image, which the user wants to get, from the second image. The reset third dpi is the fourth dpi. Then the user interface will retransform the second image to become the fourth image, whose dpi is the fourth dpi, by using the program to adjust the graph image coordinate and the dpi scale and the fourth image is shown on the monitor to be viewed the user. When the user is dissatisfied with the first image, which is got by using the first dpi, the user will reset the first dpi to produce the new first image, which the user wants to get, from the second image. The reset first dpi is the fifth dpi. Then the user interface will retransform the second image to become the fifth image, whose dpi is the fifth dpi, by using the program to adjust the graph image coordinate and the dpi scale and the fifth image is shown on the monitor to be viewed the user. When the user is dissatisfied with the scope, which is selected in the previous procedure, the previous scope is used to be the first scope and the second scope of the first image is selected in the user interface. Then the user interface will retransform the second image to become the sixth image, which is got by using the second scope, by using the program to adjust the graph image coordinate and the dpi scale and the sixth image is shown on the monitor to be viewed the user. The user can also correct the scope and the dpi in the user interface to get the image, which he or she wants to get.

In accordance with the present invention, the present invention provides a two-directions scanning method to decrease time of the scanning procedure by using the user interface to control the scan head to proceed the two-directions scanning procedure and reusing image data, which are got from a finished scanning procedure. At first, a scanning mode is chosen and the first dpi (dots per inch) of the preview procedure is set in the user interface. Then an instruction is keyed in the user interface to make a scan head move along the first scanning direction by using the first dpi and start the first scanning procedure. The first scanning procedure is a preview procedure. After finishing the first scanning procedure, a user can view the first image, which is got from the first scanning procedure, on a monitor and the scan head moves along the second scanning direction by using the second dpi to start the second scanning procedure. The second image data, which is got from the second scanning procedure, is saved in a memory. The second dpi is the highest dpi of the scan head. When a length of a paper, which the user want to scan, is longer than a length which the scan head passes through in the scanning procedure, the scan head will use the first dpi and the second dpi to proceed the second scanning procedure because the scan head has got a size and a location of the paper in the first scanning procedure to increase the efficiency of the second scanning procedure. When the scan head has not scanned the paper, the scan head will use the first dpi in the second scanning procedure. When the scan head scans the paper, the scan head uses the second dpi in the second scanning procedure. After the user selects a scope of the first image, which he or she wants to get, and the third dpi is set, the user interface will get the partial second image data, which is corresponding to the scope of the first image that is selected by the user, by using a program to adjust a graph image coordinate and a dpi scale. At last, the third image, which is got according to the third dpi and the scope of the first image that he or she wants to get, is shown on the monitor. When the third dpi is equal to the second dpi, the third image is the partial or the complete second image. When the third dpi is lower than the second dpi, the third image is produced from the second image, which is passed through an adjusting procedure of the graph image coordinate and the dpi scale. When the user is dissatisfied with the third image, which is got by using the third dpi, the user will reset the third dpi to produce the new third image, which the user wants to get, from the second image. The present invention will also increase conveniences for the user and increase the working efficiency of the user.

Although specific embodiments have been illustrated and described, it will be obvious to those skilled in the art that various modifications may be made without departing from what is intended to be limited solely by the appended claims.

What is claimed is:

1. A scanning method, comprising:
    moving a scan head along a first scanning direction to obtain a preview image using a first scanning resolution;
    displaying said preview image;
    moving said scan head along a second scanning direction generally opposite to said first scanning direction to obtain a high resolution image using a second scanning resolution that is higher than said first scanning resolution;
    receiving input corresponding to a selected portion of said preview image and a requested scanning resolution for a desired output image; and
    operating on said high resolution image to generate said output image at said requested scanning resolution and corresponding to said selected portion of said preview image.

2. The method according to claim 1, wherein said scan head moves in said second direction prior to an identification of said requested scanning resolution.

3. The method according to claim 1, wherein said output image is generated without further movement of said scan head.

4. The method according to claim 1, wherein said second scanning resolution is a highest available scanning resolution of said scan head.

5. The method according to claim 1, wherein said high resolution image is operated on by adjusting a graph image coordinate.

6. The method according to claim 1, wherein said high resolution image is operated on by adjusting a scanning resolution scale.

7. The method according to claim 1, wherein said requested scanning resolution is less than or equal to said resolution.

8. The method according to claim 1, wherein said second resolution is preset, and wherein said selected portion of said preview image and said requested scanning resolution are identified in a user interface.

9. A scanning method, comprising:
    moving a scan head along a first scanning direction to proceed with a first scanning procedure using a first scanning resolution, wherein a first image is obtained from said first scanning procedure;
    displaying said first image as a preview image;
    moving said scan head along a second scanning direction to proceed with a second scanning procedure using a second scanning resolution, wherein a second image is obtained from said second scanning procedure;
    receiving input corresponding to a user-selected portion of said preview image and a user-selected third scanning resolution: and
    operating on said second image to generate a third image at said third scanning resolution and corresponding to said user-selected portion of said preview image, wherein said third image is generated without further movement of said scan head.

10. The method according to claim 9, wherein said scan head is moved along said second scanning direction prior to an identification of said user-selected portion.

11. The method according to claim 9, wherein said first scanning resolution is lower than said third scanning resolution.

12. The method according to claim 9, wherein said third scanning resolution is lower than said second scanning resolution.

13. The method according to claim 9, wherein said second scanning resolution is a highest available scanning resolution of said scan head.

14. The method according to claim 9, wherein said second image is operated on by adjusting a graph image coordinate.

15. The method according to claim 9, wherein said second image is operated on by adjusting a scanning resolution scale.

16. The method according to claim 9, wherein a fourth scanning resolution is identified after said third image is generated.

17. The method according to claim 16, wherein said second image is operated on to generate a fourth image according to said fourth scanning resolution, wherein said fourth image is generated without further moving said scan head.

18. The method according to claim 9, wherein said second scanning procedure is performed prior to an identification of said user-selected portion.

19. The method according to claim 9, wherein said second image is operated on to generate said fourth image by adjusting a scanning resolution scale and a graph image coordinate.

20. The method according to claim 9, further comprising identifying a different portion of said preview image; and operating on said high resolution image to generate a second output image, wherein said second output image is generated without further movement of said scan head.

21. A system, comprising:
means for moving a scan head along a first scanning direction to proceed with a first scanning procedure using a first scanning resolution, wherein a first image is obtained from said first scanning procedure;
means for moving said scan head along a second scanning direction to proceed with a second scanning procedure in a second scanning resolution which is higher than said first scanning resolution, wherein a second image is obtained from said second scanning procedure;
means for selecting a portion of said first image;
means for selecting an output resolution; and
means for operating on said second image to obtain a third image corresponding to the selected portion of said first image and the selected output resolution, and wherein said first scanning direction is generally opposite to said second scanning direction.

22. The system according to claim 21, wherein said scan head moves in said second scanning direction prior to the selection of said portion of said first image.

23. The system according to claim 21, wherein said third image is generated without further movement of said scan head.

24. The system according to claim 21, wherein the selected output resolution is less than or equal to said second resolution.

25. A system, comprising:
a scan head configured to perform two or more scanning operations at different scanning resolutions, wherein a first scanning operation comprises scanning at a first resolution to obtain a preview image, and wherein a second scanning operation comprises scanning at a second resolution higher than said first resolution to obtain a high resolution image;
a user interface configured to display said preview image, wherein said user interface comprises a component for selecting a portion of said preview image and a component for selecting an output resolution during said second scanning operation; and
a processor configured to operate on said high resolution image to generate an output image corresponding to said portion of said preview image and said output resolution.

26. The system according to claim 25, wherein said scan head is configured to scan in a first direction during said first scanning operation, and wherein said scan head is further configured to scan in a second direction opposite said first direction during said second scanning operation.

27. The system according to claim 26, wherein said scan head is configured to perform said second scanning operation at the same time as said portion of said preview image is selected.

28. The system according to claim 26, wherein said scan head is configured to begin said second scanning operation prior to a selection of said output resolution.

29. The system according to claim 25, wherein said output image is generated without said scan head performing any further scanning operations.

* * * * *

UNITED STATES PATENT AND TRADEMARK OFFICE
CERTIFICATE OF CORRECTION

PATENT NO. : 7,492,489 B2
APPLICATION NO. : 10/054961
DATED : February 17, 2009
INVENTOR(S) : Kuan-Yu Lee It is certified that error appears in the above-identified patent and that said Letters Patent is hereby corrected as shown below:

At column 8, line 17, after "said" insert -- second --.

At column 8, line 35, delete ":" and insert -- ; --, therefor.

At column 9, line 23, after "resolution," delete "and".

Signed and Sealed this

Twenty-fifth Day of August, 2009

David J. Kappos
*Director of the United States Patent and Trademark Office*